Aug. 13, 1968  F. M. BOUSKILL  3,396,845
WATER CONDITIONING SYSTEM
Filed June 18, 1964  7 Sheets-Sheet 4

INVENTOR.
FREDERICK M. BOUSKILL
BY Eugene C. Knoblock
ATTORNEY

INVENTOR.
FREDERICK M. BOUSKILL
ATTORNEY

United States Patent Office 3,396,845
Patented Aug. 13, 1968

3,396,845
WATER CONDITIONING SYSTEM
Frederick M. Bouskill, South Bend, Ind.; St. Joseph Bank and Trust Co., and June S. Bouskill, representatives of said Frederick M. Bouskill, deceased, assignors to June S. Bouskill
Filed June 18, 1964, Ser. No. 376,082
13 Claims. (Cl. 210—98)

This invention relates to improvements in water conditioning systems, and more particularly to an automatic system adapted to provide the continuous supply of conditioned water at an outlet. The device is preferably of the type utilized for softening water, but also is applicable for filtration of water to remove physical matter causing turbidity and treatment of water for the removal of iron, sulphur or other undesired content, and for the neutralization of acid or alkaline water or for the deionization of water.

Various prior attempts have been made to produce an automatic water conditioner which would provide conditioned water continuously. Usually such mechanisms include parts operated by electric power, including time clocks which are expensive and subject to failure or to frequent requirements for servicing. Such prior devices have also had the undesirable feature of bypassing untreated water during regeneration. Another deficiency of prior automatic conditioners constructed to be meter driven has been the disadvantage of slow operation of valves or the requirement for an excessive amount of water power which tends to damage the meter drive unit. Still another disadvantage of prior automatic water conditioners has been their usual control through timing means so that the unit is subject to regeneration before regeneration is required, or after the unit has become exhausted if the set time does not coincide with the time at which regeneration is needed.

It is the primary object of this invention to provide an automatic water conditioning system which will overcome the defects and disadvantages of prior automatic water conditioning units.

A further object is to provide a conditioner which avoids escape or discharge of raw water or treating media at the conditioned water outlet and which utilizes treated water to regenerate the treating media, such as zeolite, while providing a continuous delivery of conditioned water at an outlet.

A further object is to provide a fully automatic water conditioner discharging conditioned water continuously and which requires no application of power other than that supplied by the pressure and volume of the water being treated.

A further object is to provide a water conditioner utilizing dual tanks containing water-treating material at which water is treated alternately and in which the treating media in one tank is treated or reconditioned during the time that the other tank is utilized to treat water.

A further object is to provide a device of this character with automatic controls whose actuation is timed automatically and accurately in response to a predetermined quantity of water treated by the device.

A further object is to provide a device of this character which mounts treating tanks releasably to accommodate rapid and simple removal and replacement.

A further object is to provide a device of this character utilizing a meter to actuate injector means for introducing treating media into a treating element in proportion to the water flow in the system.

A further object is to provide a device of this character wherein brine or other regenerating material for water treating media is injected by a positive displacement action and maintained at a minimum rate of supply accurately metered, and wherein the frequency of injection is directly related to water usage or consumption in the system.

A further object is to provide a device of this character wherein regeneration of water treating media is hydraulically controlled to provide fast backwash, slow injection of treating material, slow rinse and fast rinse, followed by shut-off.

Other objects will be apparent from the following specification.

The basic components of my improved water conditioner constitute two containers 31 and 32 formed of any suitable material, such as metal or plastic, and containing granular water-conditioning material of suitable character, such as a zeolite. The two tanks 31 and 32 are connected with an upper two-way hydraulic valve 33 and a lower two-way hydraulic valve 34. Water flowing in the system is measured by a suitable meter 35 which may include a register or recorder 36. The meter 35 serves to drive an alternator valve 37 for controlling the direction in which water flows to and through the valves 33 and 34 and the tanks 31 and 32. A regenerator unit 38, which includes a liquid flow meter and a treating injector, responds to water flow controlled by the alternator 37 and serves to time and regulate the injection of treating material during regeneration supplied from a source, such as a reservoir or dissolver (not shown).

Figure 1:
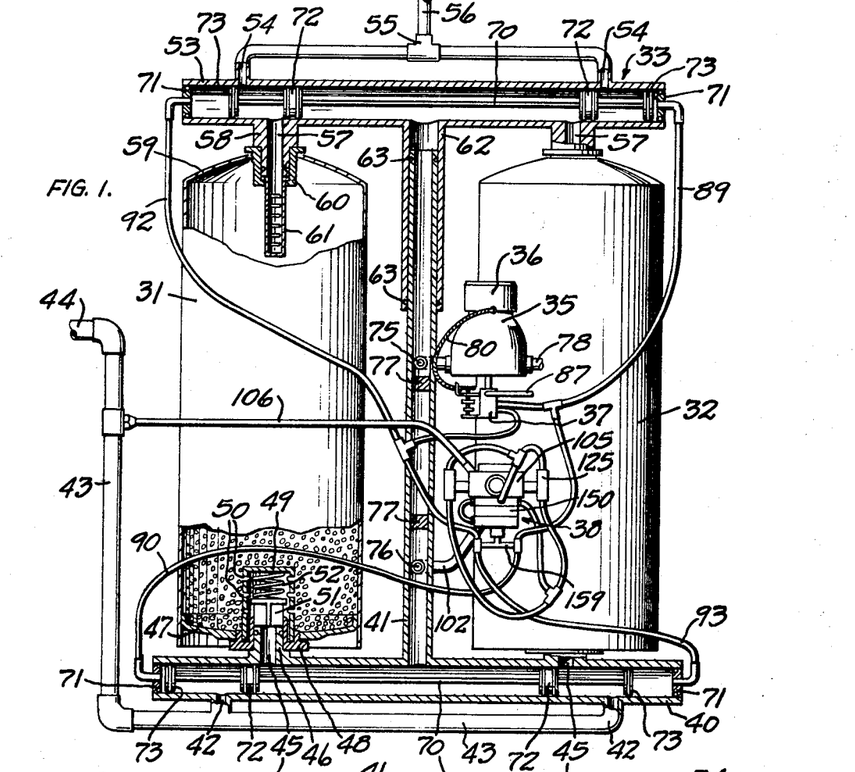
FIG. 1 is a view of the device in elevation with parts shown in section.

The tanks 31 and 32 are supported on a suitable frame structure which includes the elongated cylindrical housing 40 forming the housing of the lower valve 34, and a substantially vertical tube 41 secured to and communicating with the center of the cyindrical valve housing 40. It will be understood that other parts of the frame will be provided to stabilize it to maintain the tanks 31, 32 upright. The valve housing 40 has a pair of spaced outlets 42 substantially equally spaced from the opposite ends of housing 40 and communicating by a conduit 43 with a discharge line 44 at which conditioned water is delivered. Valve housing 40 has a pair of inlets 45 projetcing upwardly and spaced inwardly relative to the respective adjacent outlets 42 and defined in part by upwardly projetcing tubular members 46. Each of the tanks 31 and 32 has a bottom 47 having a central opening in which is mounted a fitting 48 having a snug slidable fit upon the tube 46 and an O-ring or other seal to prevent leakage between parts 46 and 48, as well understood in the art. A cap 49 is carried by fitting 48 and projects into the tank and is characterized by a plurality of slots 50 admitting water into the cap but of a type and dimension to resist discharge of granular water-treating material therethrough. A valve member 51 is slidable in the fitting 48 and is spring-urged at 52 to seat on the upper end of the fitting 48 when the tank is removed from the tube 46. Assembly or mounting of the tank upon the valve tube 46 displaces the valve 51 to open position, as illustrated in FIG. 1.

The upper valve 33 has an elongated horizontal cylindrical housing 53 having a pair of longitudinally spaced drain ports 54 substantially equally spaced from the ends of the housing 53 and connected by a manifold 55 with drain 56. Valve housing 53 has a pair of longitudinally spaced ports 57 which are defined by parallel depending tubes 58. The top 59 of each tank has a central aperture mounting a socket type fitting 60 slidably and sealing receiving a portion of a valve tube 58 and mounting a depending reticulated or slotted inlet 61 projecting into the top portion of the tank. Any suitable sealing means, such as O-rings, may provide a sealed joint between tube 58 and socket fitting 60 upon the assembly of the upper valve 33 with the tanks. The cylindrical housing 53 of the upper valve has a depending tube 62 located centrally of the valve housing 53 and communicating therewith. Depending tube 62 has a telescopic fit upon the upper end of the upwardly projecting tube 41 and circumferential seal 63, such as O-rings, are provided at longitudinally spaced points of the telescoping parts to effect a seal between tubes 41 and 62 when they fit telescopically.

Figure 4:
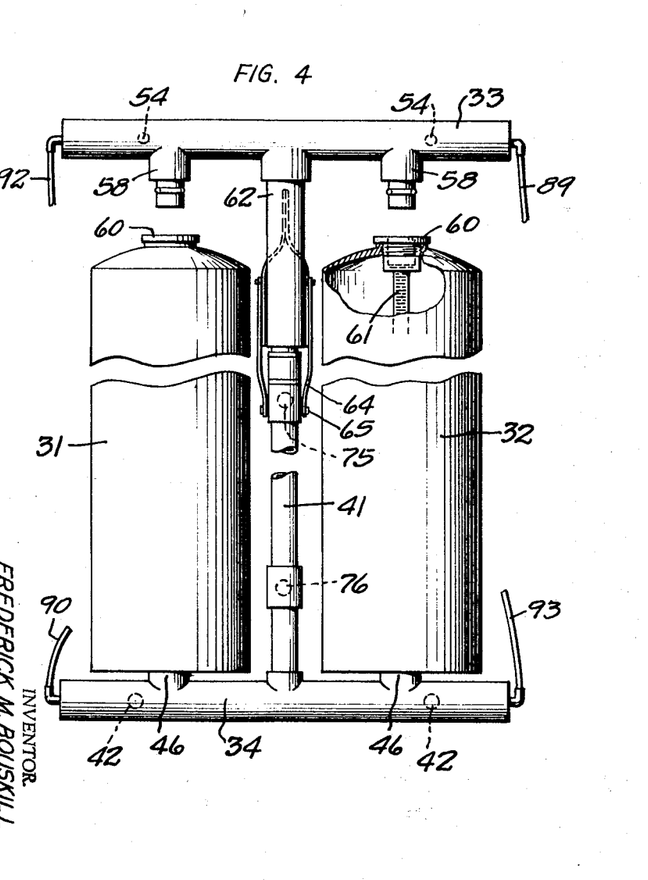
FIG. 4 is a front elevational view of the tank mounting means illustrated in partly disassembled position.
Figure 5:
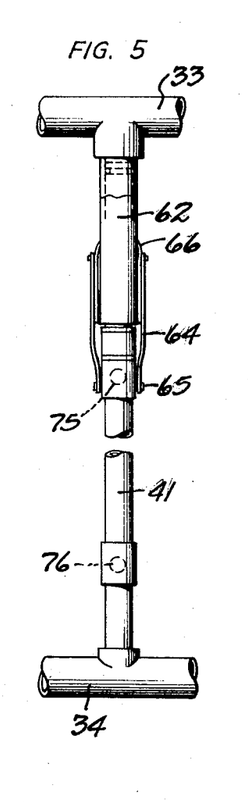
FIG. 5 is a fragmentary view of a connector forming a part of the tank-mounting means.
Figure 6:
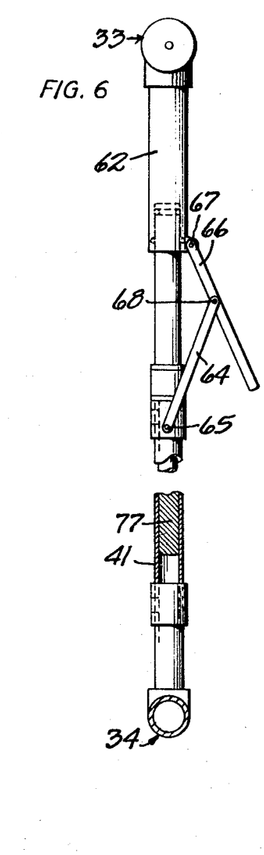
FIG. 6 is a view of the connector taken at right angles to the view seen in FIG. 5, and with parts in released position.

Any suitable lock means may be utilized for interconnecting the tanks 31 and 32 with the upper and lower valves 33 and 34 and the associated frame parts. One such mechanism is illustrated in FIGS. 4, 5 and 6, wherein a pair of links 64 are pivoted at 65 at one end thereof to an intermediate portion of the tube 41 of the frame. A U-shaped link member 66 has its free ends pivoted at 67 to the lower end portion of the tube 62, and at its intermediate part has pivotal connection at 68 with the free ends of the links 64. This arrangement provides a toggle type of lock when the structure is lowered, as seen in FIG. 1 and FIG. 5, in which case the bight of the handle-forming link 66 passes over center to maintain the telescoping tubes 41 and 62 in a predetermined telescoped position at which the connections of the upper and lower ends of the tanks 31 and 32 with the valves 33 and 34 is effected.

Each of the valves 33 and 34 has a longitudinally shiftable valve spool unit therein, preferably consisting of an elongated rod 70 of a length shorter than the spacing between the end closures 71 of the respective valve housings 40 and 53. Each valve spool or rod 70 has a pair of disks 72 mounted thereon spaced from center to center thereof a distance equal to the spacing between the centers of the inner pair of ports, such as ports 45 of valve housing 40 and the ports 57 of valve housing 53. Each valve spool or spindle also mounts an outer disk 73 spaced from the adjacent inner disk 72 a distance greater than the spacing between adjacent ports at the opposite ends of the cylinders, that is, greater than the spacing between the ports 42 and 45 of the housing 40 and greater than the spacing between the ports 54 and 57 of the housing 53. Each of the valve disks 72 and 73 has an annular seal, such as an O-ring, and has a slidable fit within the cylindrical valve housing thereof. The disks 72 preferably have two annular seals spaced greater than the diameter of ports 45 and 57 to prevent flow between the two ports 45 or the two ports 57 in all operating positions.

The upright tube 41 has an upper port 75 and a lower port 76, and one or more plugs 77 between the two ports 75 and 76. The port 75 is connected to conduit 78 in which main water meter 35 is connected.

The main meter 35 has a mechanical drive with which a flexible cable type of drive transmission 80 is connected to actuate a worm 81 which meshes with a worm gear 82 constituting a drive for the alternator valve 37 which is suitably mounted adjacent to the main meter 35. The alternator valve may be of the construction best illustrated in FIGS. 18 to 21, and constitutes a valve body 83 having a pair of spaced parallel passages 84 and 85 therein open at one end and communicating at the inner end thereof with a raw water passage 86 having connection through a conduit 87 with a source of water under pressure. The upper valve passage 84 has a port 88 provided with a fitting with which communicates a flexible conduit 89 connected to discharge into the righthand end of the upper valve housing 53 and a flexible conduit 90 connected to discharge into the lefthand end of the lower valve housing 40. The lower valve passage 85 has a port 91 provided with a fitting and connected by a flexible conduit 92 with the lefthand end of the upper valve housing 53, and connected by a flexible conduit 93 with the righthand end of the lower valve housing 40. The upper and lower passages 84 and 85 are interconnected with drain means 94 spaced between the respective ports 88 and 91 and the open ends of the passages 84 and 85 at the right as viewed in FIGS. 18 to 21.

Figure 18:
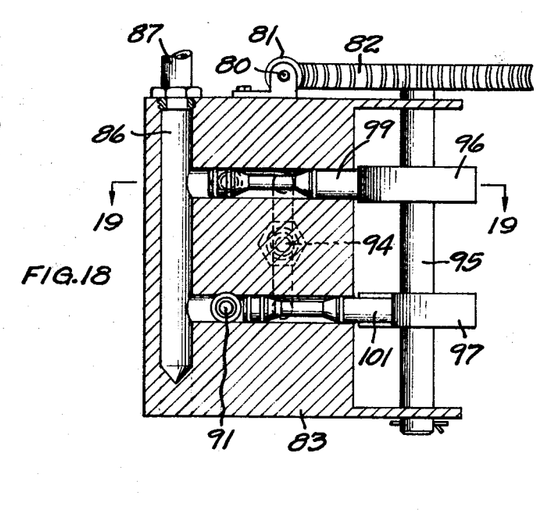
FIG. 18 is a sectional view of an alternator valve forming a part of the device, as seen in line 18—18 of FIG. 19.
Figure 19:
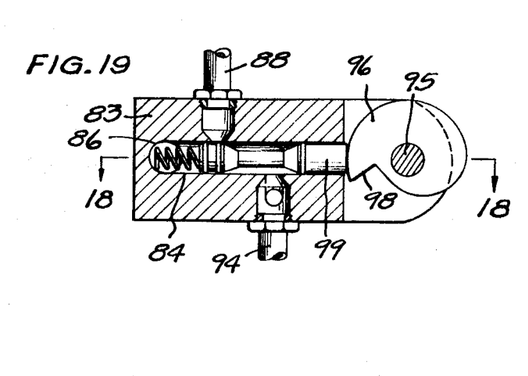
FIG. 19 is a sectional view taken on line 19—19 of FIG. 18.
Figure 20:
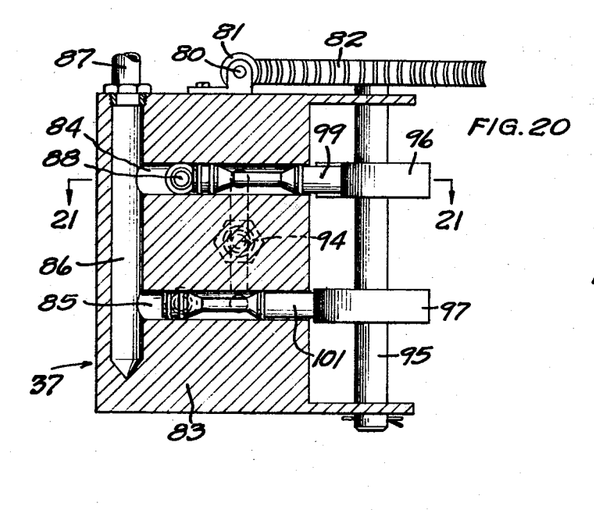
FIG. 20 is a sectional view of the alternator valve taken on line 18—18 of FIG. 19, and illustrating a different operating position thereof.

The valve body 83 suitably journals a cam shaft 95 mounting the worm gear 82. The shaft 95 mounts a pair of cam members 96 and 97 adjacent to the open ends of the valve passages 84 and 85. Each of the cam members is characterized by a rapid drop shoulder portion 98, and these shoulders 98 on the two cams are displaced 180 degrees. An upper valve spood 99 is shiftable in the upper valve passage 84 under the pressure of spring 100 which urges the spool against the adjacent cam 96. The lower valve passage 85 slidably receives lower valve spool 101, also spring-urged to press it against the cam 97. The valve spools 99 and 101 each has a reduced diameter intermediate portion of a length greater than the spacing between the drain passage 94 and the adjacent valve port, i.e., port 88 or 91. Each spool has an inner land with two annular seals spaced greater than the diameter of the ports 88 and 91. The throw of the cams is such as to adjust the valve spools 99 and 101 between opposite limit positions as illustrated in FIGS. 18 and 20. Thus in the position shown in FIG. 18, the valve spool 99 is positioned to close the flow of water from passage 86 to port 88 and to accommodate flow from port 88 to drain 94. The lower valve spool in the FIG. 18 position permits flow from passage 86 through passage 85 to port 91 and prevents flow from passage 85 to drain 94.

The alternator valve 37 functions in response to the volume of water flowing through the system as measured by the main meter 35 to periodically cycle the tanks 31 and 32 in and out of service by reversing the setting of the valves 33 and 34. Thus assuming that the device is in the position illustrated in FIG. 1, water flows through inlet 78, port 75, tubes 41 and 62, the central part of valve cylinder 53 to right valve port 57 and into the upper end of the tank 32. Water flows downwardly through the tank 32 and enters the slots 50 of the cap 49 to discharge at the right port 45 of the lower valve housing 40. Water from the end part of the lower valve housing 40 flows through right outlet port 42 and tube 43 to outlet line 44. At a time depending on the contour of the valve cam 97 water flows from conduit 102 to port 76, conduit 41, the central part of lower valve cylinder 40, the left port 45, upwardly through tank 31, through the port 57 to the left end of upper valve cylinder 53 to drain port 54, drain manifold 55 and drain line 56.

At the same time, during regeneration, water may flow through conduit 102 depending upon the setting of the regenerator control unit 38, to discharge at port 76 into the lower part of the tube 41 and thence the central portion of the valve housing 40 to flow left to inlet port 45 at the lower end of the tank 31. Water flows upwardly through the tank 31 to the tank outlet port 47 and into the upper valve housing 53 between the left valve disks 72 and 73 for discharge at 54 to drain conduit 56.

Figure 2:
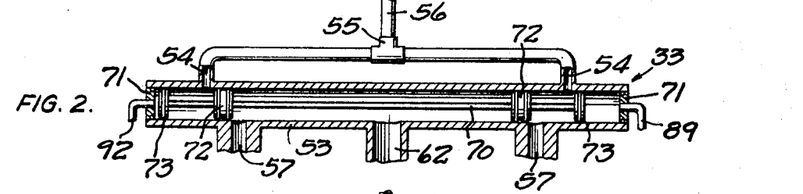
FIG. 2 is an axial sectional view of a tank selecting valve positioned in the setting opposite that shown in FIG. 1.
Figure 3:
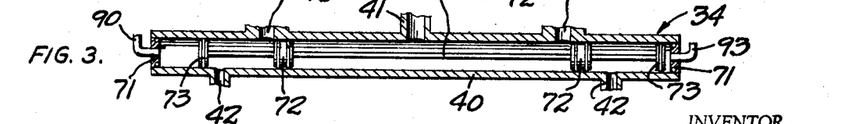
FIG. 3 is an axial sectional view of the second tank-selecting valve shown in a position opposite that shown in FIG. 1.
Figure 21:
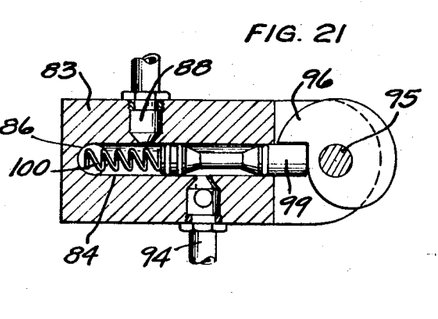
FIG. 21 is a sectional view taken on line 21—21 of FIG. 20.
Figure 22:
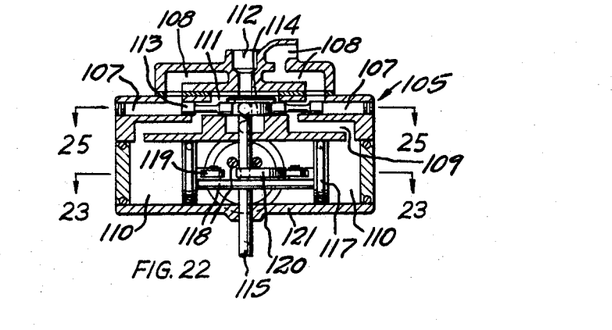
FIG. 22 is an axial sectional view of a fluid metering unit used in conjunction with a control valve and shown on line 22—22 of FIG. 25.

After a predetermined volume of water passes through the meter sufficient to drive the alternator valve cams 96 and 97 through 180 degrees, the alternator valve changes the setting of one of the spool valves 99 and 101 instantaneously when the spool valve passes the rapid drop shoulder 98 to assume the position illustrated in FIG. 21. When this action occurs, water supplied at conduit 87 at line pressure enters the port of the passage of the newly dropped spool valve, for example, at port 88 of the passage 84, which provides a supply of water at line pressure in conduits 89 and 90 to reverse the settings of the valve spools to the settings illustrated in FIGS. 2 and 3, respectively, in the valves 33 and 34. When this occurs, water is displaced from the valves 33 and 34 through the lines 92 and 93 to the port 91 for flow through passage 85 to the drain 94, as seen in FIG. 20. Thereupon, flow of water from inlet 78 through the device is reversed to produce downflow through the left tank 31 for treating purposes and discharge at the supply outlet 44. At a later time controlled by the contour of the other of the valve cams 96 and 97, an upflow of water occurs in the other tank 32 for discharge at the drain 56 under the control of the regenerating control unit 38. The reversal is automatic as measured by the volume of water flowing through the meter 35 and requires only the power of the water being supplied to the system and treated thereby. The frequency of reversal is not a function of time and does not require manual attention.

Figure 25:
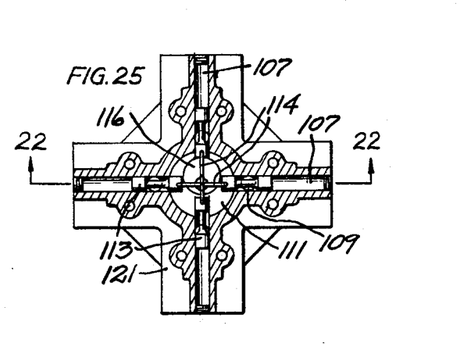
FIG. 25 is a sectional view taken on line 25—25 of FIG. 22, and illustrating the parts in one operating position.
Figure 26:
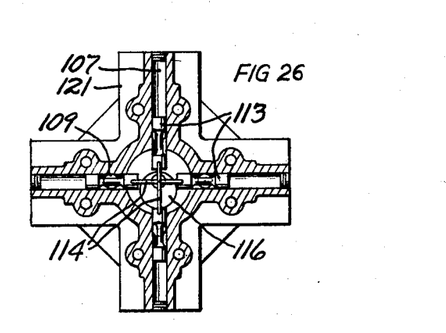
FIG. 26 is a sectional view taken on line 25—25 of FIG. 22, and illustrating the parts in a second operating position.

The regenerator control unit 38 is provided with a metering driving unit 105, which is connected by conduit 106 with the conditioned water outlet conduit 43. The metering driving unit 105 is preferably of the character illustrated in FIGS. 22 to 26, and is provided with a housing 121 which has four radial valving passages 107 arranged in pairs of aligned passages which are perpendicular to the passages of the other pair, as illustrated in FIGS. 25 and 26. Each of the radial valve passages 107 communicates with a manifold 108 communicating with the inlet conduit 106. Communication between each radial passage 107 and manifold 108 occurs intermediate the length of each radial passage and radially outwardly of a discharge passage 109 connecting each radial passage 107 with the other end of a second large radial passage 110. Four large radial passages 110 are provided, aligned in pairs, with the passages of opposite pairs intersecting. The radial passages 107 communicate with a central chamber 111 which communicates with an outlet 112. Each radial passage 107 has a valve spool 113 slidable endwise therein and provided with a pair of spaced lands, each having one or more annular seals. Aligned valve spools 113 are interconnected by connector member 114 which spaces them a predetermined distance apart. A shaft 115 is journaled in valve housing 121 centrally thereof to extend perpendicularly relative to the radial valve passages 107 and 110. Shaft 115 mounts cam 116 in the nature of a disk mounted eccentrically upon the shaft 115 and having a diameter substantially equal to or slightly less than the spacing between the adjacent ends of pairs of valve spools 113 as determined by the connectors 114. A piston 117 is slidable in each radial passage 110. Each piston 117 is connected by rods 118 with the axially aligned piston, said rods 118 passing the shaft 115 with clearance. Each piston 17 carries a cam follower 119 engageable with a cam disk 120 eccentrically mounted upon shaft 115.

Figures 23, 24:
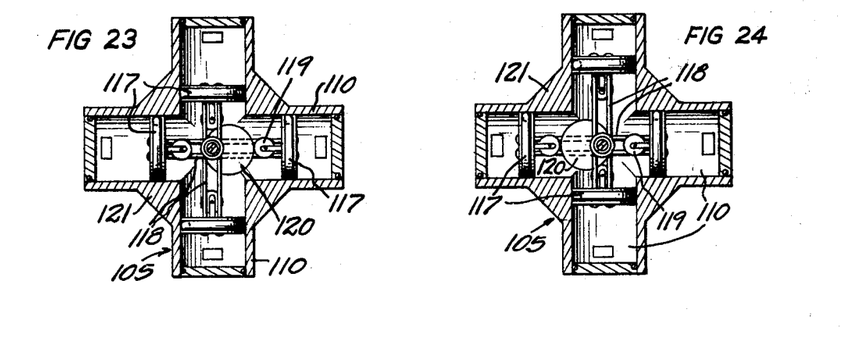
FIG. 23 is a sectional view taken on line 23—23 of FIG. 22 and illustrating the parts in one operative position.
FIG. 24 is a sectional view taken on line 23—23 of FIG. 22, and illustrating the parts in a second operating position.

The cam disks 116 and 120 are angularly displaced in radial directions at a predeterminet angle of approximately 90 degrees and preferably in a range between 85 degrees and 95 degrees. As a result of this angular displacement of the cam disks, the path of flow of water from the inlet manifold to and through the respective valve passages 107 and 110 changes progressively and in a manner to cause the pistons 117 to transmit to the valve disk 120 forces which swing the cam disk and rotate the shaft 115. Thus when the meter is positioned as illustrated in FIGS. 23 and 25, the cam disk 116 has opened the uppermost valve spool 113 to the maximum for delivery of water from the inlet manifold 108 to the uppermost piston 117, as viewed in FIG. 23, and has started to move the righthand valve spool 113 to establish communication between the intake manifold 108 and the righthand radial valve passage 110 for exertion of liquid pressure thereagainst toward the left as viewed in FIG. 23. At the same time the lowermost valve spool 113 has been moved to its innermost position at which it establishes communication between the lowermost large radial passage 110 and the discharge passage 111, so that water drains from the lower passage 110 as it is being fed to the upper passage 110. The provision of four radial valve passages 107 and four radial passages 110, with the passages in each group being equiangularly displaced, insures a steady and progressive operation of the meter and a steady rotation of the meter shaft 115 responsive to the rate of flow of liquid in the system.

Figure 27:
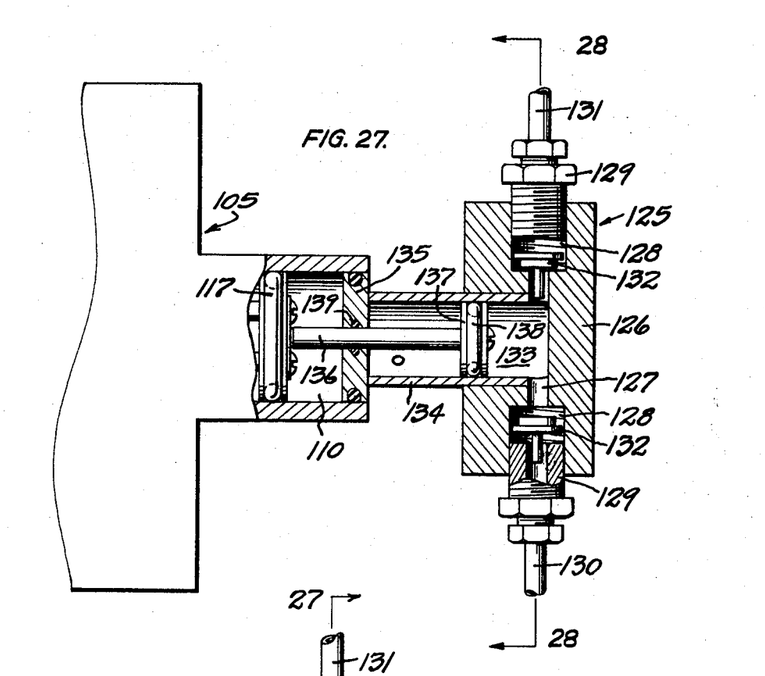
FIG. 27 is a sectional detail view illustrating a positive displacement injector associated with a meter mechanism and taken on line 27—27 of FIG. 28.
Figure 28:
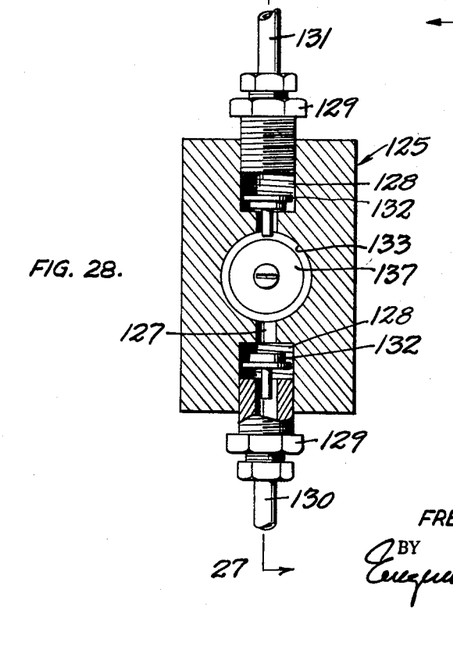
FIG. 28 is a sectional view taken on line 28—28 of FIG. 27.

The meter 105 forming a part of the regenerator control unit may also be used as means to inject a regenerating fluid, such as brine in a water softener. One construction of injector driven by meter 105 is illustrated in FIGS. 27 and 28. One or more injetcors 125 may be connected to and driven by the meter 105. Each injector is connected to one of the pistons 117 of the meter 105 to be actuated thereby. In the form of the injector shown in FIGS. 27 and 28, the injector 125 has a housing 126 having a passage 127 extending therethrough which is enlarged adjacent each end thereof to define a valve chamber 128. At the outer end of each chamber 128 is mounted a fitting 129 for connection with a lower inlet conduit 130 and an upper outlet conduit 131, respectively. Each valve chamber 128 has a valve member 132 therein which is normally biased in a direction toward the inlet as by gravity or by a spring (not shown). Thus the upper valve member 132 normally seats against the shoulder at the inlet of its valve chamber, and the lower valve member 132 normally seats against the inner end of the lower fitting 129.

The valve housing 126 has a central chamber 133 extending transversely of and communicating with the passage 127 between the valve chambers 128. A cylindrical member 134 fits in the chamber 133 and projects therefrom and provides means for support of the housing 126 by connection with end wall 135 carried by the metering member 105 and spanning and sealing the end of a radial passage 110. End wall 135 has a central aperture through which passes slidably piston rod 136 secured to the piston 117 and mounting a piston 137 slidable in the cylinder 134. Piston 137 has an annular seal 138, such as an O-ring. An annular seal 139, such as an O-ring, is carried by the wall 135 and encircles the piston rod 136.

The injector 125 constitutes a positive displacement pump. Thus each inward stroke of the pump piston 137, i.e. to the left in FIG. 27, creates a suction in the chamber 133 which lifts the lower valve 132 from its seat and permits the flow of treating liquid from the inlet conduit 130 into the chamber 133. At the same time suction acts upon the upper or outlet valve to hold it closed. Upon the reverse stroke of the piston 137 outwardly or to the right as seen in FIG. 27, the piston applies pressure against the liquid in the chamber 133 to unseat the upper or outlet valve 132 and to close the inlet or lower valve 132.

Figures 7, 8, 9:
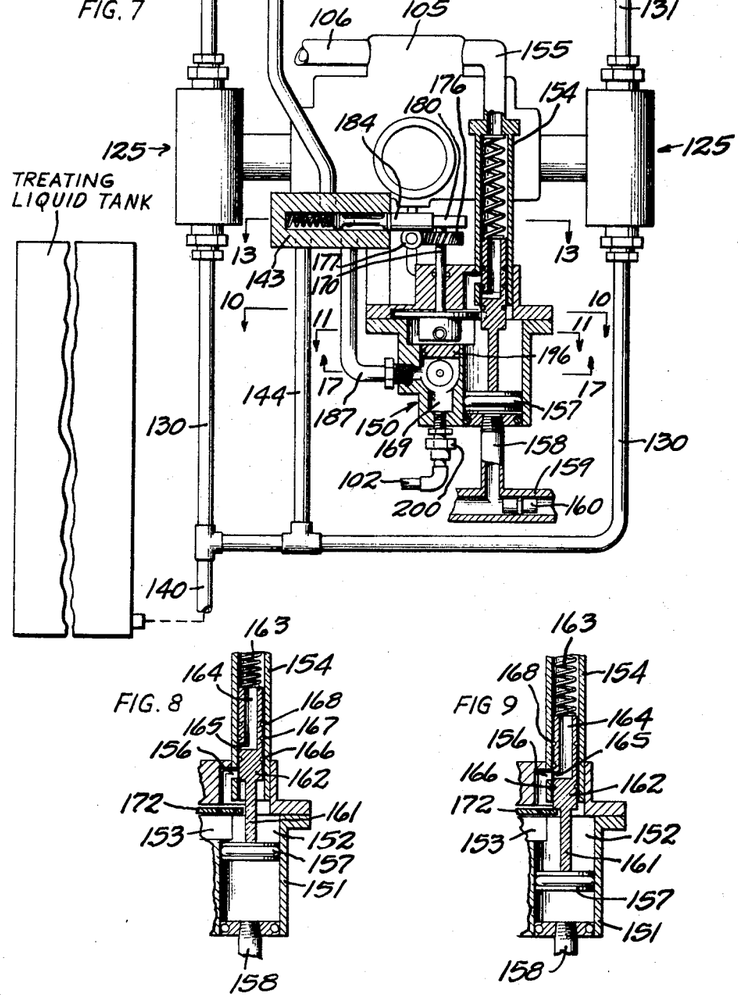
FIG. 7 is an enlarged view of the regenerating control portion of the device, with parts shown in section.
FIG. 8 is a fragmentary sectional view of the regeneration control unit shown in a different operating position than that illustrated in FIG. 7.
FIG. 9 is a sectional view of a part of the regenerator control mechanism shown in a third operating position.

In the regenerator control unit here illustrated, as best seen in FIG. 7, two injectors 125 are utilized. The inlet conduits 130 of the two injectors are connected to a common supply line 140 which extends to a tank or reservoir of treating fluid, such as a brine tank (not shown). The outlet conduits 131 are connected by a cross conduit 141 to which in turn is connected a conduit 142 extending to a supply valve 143. A conduit 144 for recirculation of treating liquid constitutes a bypass which connects the supply valve 143 and the injector inlet conduits 130.

The regenerator control unit includes a regenerator valve 150 juxtaposed to the meter 105 and to the supply valve 143 and so oriented that both the regenerator valve 150 and the supply valve 143 are operated by the shaft 115 of the meter 105. The regenerator valve 150 is preferably of the construction best seen in FIGS. 7 to 12, 15, 16 and 17, and the supply valve 143 is preferably of the construction best illustrated in FIGS. 13 and 14. The regenerator valve 150 has a housing 151 provided with an elongated vertical passage 152 and an upper passage 153 which have intercommunication at an intermediate part of the passage 52. The valve housing 151 is open at its top in communication with and in alignment with the passage 152, and the lower end of an elongated cylindrical or tubular member 154 is secured in the upper end of the passage 152 and projects thereabove for connection at its outer end with conduit 155 which communicates with the outlet of the metering unit 105. The lower portion of the tubular member 154 located within the upper part of the passage 152 is eccentric thereof and has a port 156 therein in lateral or open communication at all times with the upper end of the passage 152 and the passage 153.

The lower part of the passage 152 constitutes a cylinder within which a pressure responsive piston 157 is slidable. Piston 157 has an annular seal to prevent flow of liquid therepast. The lower end of the cylinder has communication with a conduit 158 which forms the branch of a T fitting having a cross conduit 159. The opposite ends of a cross conduit 159 are connected to the flexible conduits 90 and 93, respectively. A pressure responsive piston valve 160 having an annular seal is slidable in the cross conduit 159 of the T fitting between predetermined limit positions to permit communication of the lower part of the cylinder chamber 152 with a selected one of the conduits 90 and 93, depending upon the relative pressure of liquid in said conduits 90 and 93. Thus the piston 157 is rendered responsive to any surge of pressure in either of the conduits 90 and 93. The piston 160 also acts as a flow restrictor valve to prevent loss of water to the drain through the alternator valve 37, i.e. valve 160 insures application of pressure to the reversing valves 33 and 34 in proper direction and automatic tapping of that hydraulic pressure to activate the regenerator control valve 150. Piston 157 actuates an elongated small diameter rod 161 extending upwardly therefrom and mounting at its upper end an elongated enlarged cylindrical valve plug 162 slidable within the tube 154 and normally pressed downwardly to a bottom limit position, as seen in FIG. 7, by spring 163. Valve plug 162 has a central passage 164 open at its upper end and extending for a part only of its length and terminating in a lateral outlet port 165 adapted to register with port 156 in one operative position, as illustrated in FIG. 9. Valve plug 162 has a lower circumferential seal 166 below the plug port 165 and an intermediate circumferential seal 167 above the lateral plug port 165 and an upper circumferential seal 168. The seals 166, 167 and 168 are spaced apart a distance slightly greater than the dimension of the tube port 156 and are so positioned that one or more thereof will be located above the tube port 156 in each operative position of the valve plug and one thereof will be located below the port 156 in each of the positions shown in FIGS. 7 and 9.

Figure 10:
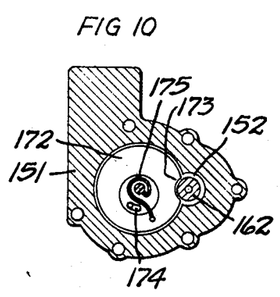
FIG. 10 is a sectional view taken on line 10—10 of FIG. 7.

The upper part of the regenerator valve housing 151 journals cam shaft 170 in axial alignment with the valve passage 153. At its lower end the shaft 170 mounts an eccentric cam disk 171 which is fixed on the shaft, and an enlarged latching disk 172 which bears upon the cam 171 is rotatable upon the shaft 170. Latch disk 172 is peripherally interrupted by a notch 173 and is of a diameter to fit partially around the lower part of the valve plug 162 at said notch when the plug 62 is in its lowermost position, as illustrated in FIGS. 7 and 10. Latch disk 172 has clearance with the piston rod 161 in the elevated position of the valve plug illustrated in FIGS. 8 and 9. The eccentric disk 171 and the latch disk 172 have a pin and slot connection 174 which limits rotation of the latch disk 172 relative to the cam disk 171. A spring 175 connects shafts 170 and latch disk 172 to normally urge the latch 172 to one limit position determined by said pin and slot connection. The cam shaft 170 mounts a worm gear 176 above regenerator valve housing 151 which meshes with worm 177 driven by the shaft 115 of the meter 105.

Figure 13:
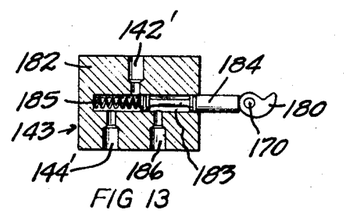
FIG. 13 is a sectional view taken on line 13—13 of FIG. 7 and illustrating the parts in one operating position.
Figure 14:
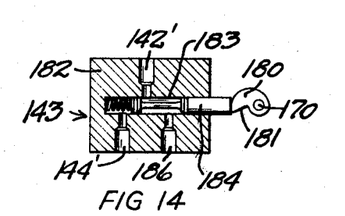
FIG. 14 is a sectional view taken on line 13—13 and illustrating the parts in a second operating position.
Figure 15:
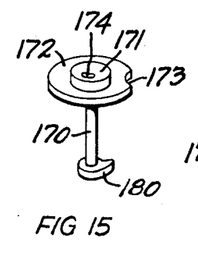
FIG. 15 is a perspective view of a cam and lock plate unit forming a part of the regeneration control unit.
Figure 16:
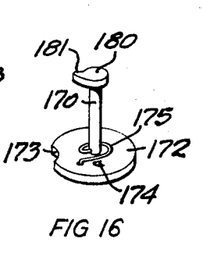
FIG. 16 is a perspective view of the parts seen in FIG. 15 but in position inverted from that shown in FIG. 15.
Figure 17:
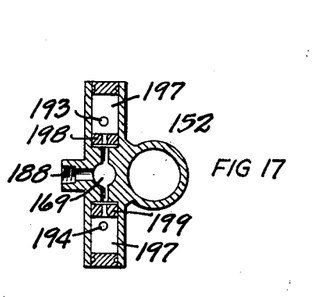
FIG. 17 is a sectional view taken on line 17—17 of FIG. 7.

At its upper end the cam shaft 170 mounts a cam 180 of the type having a rapid drop-off shoulder 181. Cam 180 is juxtaposed to supply valve 143. Supply valve 143 has a valve housing 182 having an elongated valve passage 183 therein open at one end adjacent to the cam 180 and slidably receiving therein an elongated valve spool 184 having a pair of longitudinally spaced lands each having one or more annular seals. Valve spool 184 is normally urged outwardly toward the cam 180 by a spring 185. An inlet port 142′ in the housing 182 communicates with valve passage 183 intermediate its length and also provides communication with the conduit 142. A port 144′ adapted for connection with the recirculation conduit 144 communicates with the valve passage 183 spaced from port 142 in the direction of the closed end of the valve passage 183. A delivery port 186 in the valve housing 182 communicates with the valve passage 183 spaced from the supply port 142′ in the direction of the open end of the valve passage 183. The arrangement is such that the supply valve 143 has its valve spool 184 travel between two limit positions substantially as illustrated in FIGS. 13 and 14. In one of the limit positions as illustrated in FIG. 13, the innermost land of the valve spool 184 is interposed between the ports 142' and 186 so that flow may occur between ports 142' and 144', that is, between the supply conduit 142 and the recirculating conduit 144, as seen in FIG. 7. In the FIG. 14 position of the supply valve, the innermost land of the valve spool 184 is positioned between the ports 142' and 144', and the port 142' is in communication with the port 186. The delivery port 186 of the supply valve 143 is connected by a conduit 187 with a lateral port 188 at the lower part of the valve housing 151 which communicates with a mixing chamber 169 in housing 151, as illustrated in FIG. 17. It will be understood, however, that by reversing the connections of the ports 144' and 186, to connect port 144' to conduit 187 and connect port 186 to conduit 144, the device will function equally well but will rely on spring 185 to start flow from port 142' to the conduit 187 and will rely on the cam contour to start flow from port 142' to the circulating conduit 144.

Figure 11:
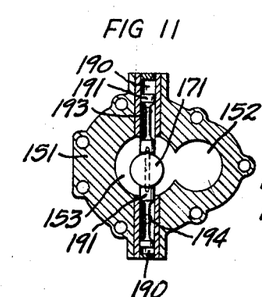
FIG. 11 is a sectional view taken on line 11—11 of FIG. 7.
Figure 12:
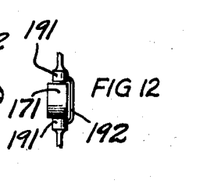
FIG. 12 is a fragmentary detail view of parts seen in FIG. 11 and taken at right angles to FIG. 11.

The portion of the valve housing 151 of the regenerator control valve located adjacent to the cam disk 171, as shown at section line 11—11 in FIG. 11, has a pair of aligned radial valve passages 190, within each of which is longitudinally slidable a spool valve 191, the spool of which has a pair of longitudinally spaced lands and an elongated reduced dimension neck between said lands. The opposed valve spools 191 are interconnected by a link 192 passing clear of the cam disk 171, as best seen in FIG. 12. Intermediate the length of each of the radial valve passages 190 is provided a port. The respective ports are identified by numerals 193 and 194. The stroke of travel of the spool valve by the cam disk 171 is such as to accommodate flow from the passage 153 to one of the ports 193, 194 at one limit portion, for example, past the upper port 193 as viewed in FIG. 11, while the other valve spool is positioned to prevent flow between chamber 153 and the opposite port, such as the port 194, as seen in FIG. 11.

The passage 153 and the chamber 169 are separated by a barrier 196 so that flow through the regenerator valve housing from the passage 153 to the chamber 169 adjacent to the lateral valve port 188 must occur through one or the other of the ports 193, 194. The valve housing 151 has a pair of passages 197 at approximately the level of the valve port 188, which passages communicate with the ports 193 and 194, respectively, and also with the chamber 169, as seen in FIG. 17. An orifice plate or other flow rate control means 198 is mounted in one passage 197 between port 193 and chamber 169 to regulate flow therethrough at a predetermined rate, for example at a rate of one gallon per minute. The other passage 197 has an orifice plate or other flow rate control means 199 positioned therein between the port 194 and the chamber 169 to regulate flow at a second rate, for example, at a rate of one-quarter gallon per minute. An outlet port is open at the chamber 169 at which is connected a fitting 200 for connection with the conduit 102 which is connected to the lower portion of the tube 41 at the port 76 for discharge to the lower valve 34.

Assuming that the device is to be employed as a water softener and that the conduit 140 is connected with a tank or reservoir containing brine, it will be observed that the device functions as follows. If we assume that the water meter register 36 is set at zero, and that water at supply line 78 has a hardness of 16 grains per gallon, that the capacity of the mineral in each of the tanks 31 and 32 accommodates ten thousand grains hardness removal, that is, each tank holds approximately one-third of a cubic foot of zeolite or resin material of high hardness removing capacity, and that it is desired to alternate the units before a hardness bleed-through occurs, a gearing arrangement at 81, 82 will be chosen to effect alternation of flow in the system to the respective tanks 31, 32 when five hundred gallons of water has flowed through the system. The flow of 500 gallons of water of sixteen grains hardness will remove 8,000 grains of hardness at each cylinder before alternating, this representing approximately 80% of the capacity of a cylinder or tank. Under the above assumptions, approximately seven quarts of 100% concentration of brine will be required to regenerate the zeolite after its operation to remove said 8,000 grains of hardness. Orifice plates 198 and 199 will be selected according to the flow rates desired, such as one g.p.m. and one-fourth g.p.m. and cams 180 will be designed to supply a required quantity of brine incident to each alternation of the system.

Alternation of the system occurs under the control of the alternator valve 37 in response to driving action through the drive cable 80 driven from the main water meter 35. Upon each alternation action, as upon drop-off of valve spool 99 at drop-off shoulder 98 of one of the cams 96, 97, a rapid reversal of valve setting of one of the valves 99, 101 will occur, with the result that a surge of water at line pressure from supply line 87 will pass to a selected pair of the flexible conduits connected to the reversing valves 33 and 34, that is, flow will occur through either lines 89 and 90 or through lines 92 and 93. This surge of pressure changes the settings of the valves 33 and 34 substantially simultaneously as explained above and is accommodated by drainage of the inactive line through port 94 which preferably is connected to drain line 56. This reversal simultaneously changes the setting of valve 160 to operate piston 157 and valve plug 162 and changes the direction of water flow in the tanks 31 and 32, so that the tank in which downflow occurred prior to the alternation of valve operation will be set for upflow, and the tank in which upflow had occurred prior to the alternation valve operation will now be set for downflow.

The tank at which upflow is set by the reversing valves 33 and 34, such as the lefthand tank seen in FIG. 1, will be subject to regeneration, as timed by continued operation of the alternator valve 37, and as controlled by the regenerator control unit 38 which responds to the pressure surge which produced the reversal of setting of the valves 33 and 34 by virtue of its T connection 158, 159 with the respective conduit pairs 89, 90 and 92, 93. Water at line pressure thus enters the lower part of the chamber 152 of the regenerator valve 150 to act against the piston 157 and raise that piston from the position shown in FIG. 7 to the position shown in FIG. 8 for the duration of the application of pressure to the selected one of the line pairs 89, 90 or 92, 93, effective to change the setting of the reversing valves 33 and 34. At this time the valve plug 162 closes off the port 156 so that no flow occurs through the regenerator control valve or through the metering unit 105. Thus all conditioned water discharged at port 42 goes to the supply line 44 and no flow occurs in the conduit 106.

During the time that the valve plug 162 is elevated in the position shown in FIG. 8, the spring 175 comes into play to shift the latch disk 172 to the extent permitted by the pin and slot connection 174, so that its notch 173 which has previously been in register with the valve plug 162 is slightly out of register therewith. Consequently, upon cessation of pressure against the piston 157, permitting the valve plug 162 to be lowered by the spring 163, the latch disk 172 underlies a part of the valve plug 162 so that the same can lower only partially to the position illustrated in FIG. 9, at which the passage 164, 165 therein registers with the port 156 of the valve. This opens flow through conduit 106, the meter 105, and the regenerating control unit 38. Flow of water through the meter 105 starts driving action of the regenerator control through meshing gears 176 and 177, causing rotation of the disk 172 and cam disk 171. This rotation continues until such time as the notch 173 in the latch disk 172 comes into register again with the valve plug 162, whereupon the plug 162 returns to the position shown in FIG. 7, again shutting off flow through the metering device 105 and the regenerator valve 150.

Initial flow of soft water from line 106 to the regenerator valve through conduit 155 when the valve is in FIG. 9 position, preferably causes backwashing of the mineral bed of the tank in which upflow occurs, which backwashing results from the discharge of soft water from the regenerator valve 150 to the conduit 102 for delivery to and through the lower reversing valve 34 at a predetermined rapid rate. After a predetermined quantity of water has passed during backwashing, while the cam 180 positions the valve spool 184 to cause recirculation of brine to conduit 144, the cam 180 will have been moved through an arc sufficient to shift the valve spool 184 to a position for brine injection, for example, to the FIG. 14 position. Brine injection occurs simultaneously with continued backwash flow of soft water with which the brine is mixed in chamber 169 at a slow rinse rate, and continues until valve spool 184 reaches the drop-off shoulder 181 to cause the spool to resume the recirculating position shown in FIG. 13. Substantially at the time brine injection starts, the cam 171 will be at a position opposite that shown in FIG. 11 and such as to shift the valves 191 so as to open the port 194 to the passage 153 of the regenerator valve to control at a slow rate the flow of water through the regenerator valve past the metering plate 199. This produces a slow initial rinse feed of selected brine concentration and then continued rinse action. During continued operation of the cam 171 and before the disk 172 completes its revolution to the FIG. 10 position, the cam disk 171 again assumes the position shown in FIG. 11, opening flow through port 193 and orifice plate 198 to increase the rate of flow and produce a fast finish rinse action. Thus it will be seen that, incident to each actuation of the alternation valve, there will occur a change of the direciton of flow in the two tanks 31 and 32, followed by initial backwash, then slow rinse, then brine injection, then slow rinse, and then fast rinse in the tank in which upflow occurs, all of which transpires during the passage of the measured amount of water required for one revolution of the latching disk 172, whereupon the regeneration unit is deactivated and all water in the outlet conduit 43 of the system passes directly to the water supply line 44.

While the preferred embodiment of the invention has been illustrated and described, it will be understood that changes in the construction may be made within the scope of the appended claims without departing from the spirit of the invention.

I claim:

1. A water conditioning system comprising
   a pair of tanks containing granular material and each having a port at its upper and lower ends,
   upper and lower hydraulically actuated reversing valves connected at said lower and upper ports,
   outlet means connected to said lower valve,
   water inlet means connected to said upper valve for flow to and downwardly through a selected tank only and to said outlet, as determined by the setting of said reversing valves,
   a meter for measuring flow through said inlet means,
   drain means connected at said upper valve,
   an alternator valve driven by said meter and connected to said upper and lower reversing valves having means to substantially simultaneously reverse the settings thereof and alter the flow path from said inlet means to said outlet means in response to a predetermined volume of flow in said inlet, thereby alternating the connection of said tanks in said inlet-to-outlet flow paths, and
   a regenerator control unit connected with a source of regenerating liquid and with said lower valve and responsive to actuation of said alternator valve for controlling delivery to said drain of regenerating liquid following upflow through the tank not connected with said outlet.

2. A water conditioning system as defined in claim 1, wherein
   a frame removably supports said tanks,
   said tanks having releasable connections with said upper and lower reversing valves.

3. A water conditioning system as defined in claim 1, wherein
   said tank shave releasable connections with said upper and lower reversing valves, and
   a frame carries said lower reversing valve and said tanks and includes a selectively positioned upper part carrying said upper reversing valve.

4. A water conditioning system as defined in claim 1, wherein
   said tanks have releasable connections with said upper and lower reversing valves,
   said reversing valves each including an elongated tubular housing connected to both tanks and an elongated valve spool in said housing controlling flow in selected paths to and from said tanks.

5. A water conditioning system as defined in claim 1, wherein
   said reversing valves each include an elongated tubular housing connected to both tanks and an elongated valve spool in said housing controlling flow in selected paths to and from said tanks,
   each tank having a fitting at each port,
   each housing having a laterally projecting tube having a slide fit in a fitting, and
   an annular seal cooperating with each interfitting tube and socket.

6. A water conditioning system as defined in claim 1, wherein
   a frame carries said reversing valves and releasably supports said tanks,
   said frame including an extensible member connecting said valve means for extending and retracting said extensible member and operative to lock said extensible manner in retracted position.

7. A water conditioning valve as defined in claim 1, wherein
   said alternator valve is connected to a source of untreated water which it directs alternately in predetermined paths to and from said reversing valves,
   said alternator valve including a drain for discharging water flowing thereto from said valves.

8. A water conditioning system comprising
   a pair of tanks containing granular material and each having a port at its upper and lower ends,
   upper and lower hydraulically actuated reversing valves connected at said upper and lower ports,
   outlet means connected to said lower valve,
   water inlet means connected to said upper valve for flow downwardly through a selected tank only to said outlet as determined by the setting of said upper valve,
   a meter for measuring flow through said inlet means,
   drain means connetced at said upper valve,
   an alternator valve responsive to operation of said meter and connetced to said upper and lower reversing valves to substantially simultaneously reverse the settings thereof in response to a predetermined volume of flow in said inlet and thereby change the path of flow from inlet to outlet to pass through the other tank of said pair, and
   a backwashing control unit connected with said outlet means and responsive to actuation of said alternator valve for controlling, immediately following each reversal of said upper and lower valves, the delivery to said drain of a metered quantity of conditioned water in an upflow through the tank which then is not connected to said outlet, said alternator valve including
a valve housing having a pair of elongated passages each open at one end and connected to a water supply passage at its opposite end,
a valve spool slidable in each passage, and
actuating cam means engaged by each spool,
said cam means being angularly displaced and each having a rapid drop shoulder,
each valve passage having communication at longitudinally spaced points with a delivery port and a drain port.

9. A water conditioning system comprising
a pair of tanks containing granular material and each having a port at its upper and lower ends,
upper and lower hydraulically actuated reversing valves connected at said lower and upper ports,
outlet means connected to said lower valve,
water inlet means connected to said upper valve for flow downwardly through one tank only to said outlet as determined by one setting of said valves,
a meter for measuring flow through said inlet means,
drain means connetced at said upper valve,
an alternator valve driven by said meter and connected to said upper and lower reversing valves to reverse the settings thereof in response to a predetermined volume of flow in said inlet and thereby establish flow from inlet to outlet through the other tank only, and
a regenerator control unit connected with a source of regenerating liquid and with said lower valve and responsive to actuation of said alternator valve for controlling delivery of regenerating liquid upwardly through the tank not connected to said outlet through the then-existing setting of said reversing valves,
said regenerator control unit including
a meter connected in a line between said outlet and said regenerator control unit, and
a regenerator valve having a drive connection with and controlling the duration of flow in said line and last named meter.

10. A water conditioning system comprising
a pair of tanks containing granular material and each having a port at its upper and lower ends,
upper and lower hydraulically actuated reversing valves connected at said lower and upper ports,
outlet means connected to said lower valve,
water inlet means connected to said upper valve for flow downwradly through one tank to said outlet,
a meter for measuring flow through said inlet means,
drain means connected at said upper valve,
an alternator valve driven by said meter and connected to said upper and lower reversing valves to reverse the settings thereof in response to a predetermined volume of flow in said inlet, and
a regenerator control unit connected with a source of regenerating liquid and with said lower valve and responsive to actuation of said alternator valve for controlling delivery of regenerating liquid upwardly through the other tank to said drain in each setting of said reversing valves,
said regenerator control unit including
a meter connected to said outlet and having a driven shaft,
a supply valve for regenerating liquid controlled by said shaft, and
a regenerating valve having a fluid passage connection with said second meter and said supply valve and a drive connection with said shaft.

11. A water conditioning system comprising
a tank containing granular material and having upper and lower ports,
upper and lower hydraulically actuated reversing valves connected at said upper and lower ports to control flow through said tank in selected direction,
outlet means connected to said lower valve,
water inlet means connected to said upper valve,
a meter measuring flow through said inlet,
drain means connected to said upper valve,
an alternator valve driven by said meter and connected to both of said reversing valves having means to reverse the setting thereof in response to a predetermined volume of flow in said inlet to determine the direction of flow through said tank, and
a regenerator control unit connected with a source of regenerating liquid and with said lower valve and responsive to actuation of said alternator valve for controlling delivery of regenerating liquid upwardly through said tank to said upper reversing valve and drain,
said upper reversing valve stopping delivery of water from said inlet means to said tank during delivery of regenerating liquid to said tank; and said lower reversing valve stopping delivery of regenerating liquid during downflow in said tank.

12. A water conditioning system comprising
a pair of tanks containing granular material and each having a port at its upper and lower ends,
upper and lower hydraulically actuated reversing valves connected at said lower and upper ports,
outlet means connected to said lower valve,
water inlet means connected to said upper valve for flow downwardly through one tank to said outlet,
a meter for measuring flow through said inlet means,
drain means connected at said upper valve,
an alternator valve driven by said meter and connected to said upper and lower reversing valves to reverse the settings thereof in response to a predetermined volume of flow in said inlet, and
a regenerator control unit connected with a source of regenerating liquid and with said lower valve and responsive to actuation of said alternator valve for controlling delivery of regenerating liquid upwardly through the other tank to said drain in each setting of said reversing valves,
said regenerator control unit including
a second meter connected to said outlet and having a driven shaft, and
a regenerator valve having a fluid passage connection with said second meter and a regeneration cycle-controlling rotatable part driven by said second meter shaft and controlling a valve element at said fluid passage to stop said regeneration cycle.

13. A water conditioning system comprising
a pair of tanks containing granular material and each having a port at its upper and lower ends,
upper and lower hydraulically actuated reversing valves connected at said lower and upper ports,
outlet means connected to said lower valve,
water inlet means connected to said upper valve for flow downwardly through one tank to said outlet,
a meter for measuring flow through said inlet means,
drain means connected at said upper valve,
an alternator valve driven by said meter and connected to said upper and lower reversing valves to reverse the settings thereof in response to a predetermined volume of flow in said inlet, and
a regenerator control unit connected with a source of regenerating liquid and with said lower valve and responsive to actuation of said alternator valve for controlling delivery of regeneratnig liquid upwardly through the other tank to said drain in each setting of said reversing valves,
said regenerator control unit including
a second meter connected to said outlet and having a driven shaft,
a regenerator valve having a shiftable part driven by said second meter shaft and a fluid connection with said second meter, and
means controlled by said shiftable part for directing liquid through different flow paths in said regenerator valve in a selected sequence.

References Cited

UNITED STATES PATENTS

| | | | |
|---|---|---|---|
| 1,763,728 | 6/1930 | Turner | 210—98 X |
| 2,081,009 | 5/1937 | Kelley | 210—236 X |
| 2,217,822 | 10/1940 | Symons | 210—277 X |
| 2,310,978 | 2/1943 | McGill et al. | 210—88 |
| 2,370,190 | 2/1945 | Ralston | 210—282 X |
| 3,048,274 | 8/1962 | Lundeen | 210—190 X |
| 3,154,484 | 10/1964 | Stoner | 210—191 X |

REUBEN FRIEDMAN, *Primary Examiner.*

J. ADEE, *Assistant Examiner.*